United States Patent
Bobel

[11] Patent Number: 5,982,106
[45] Date of Patent: Nov. 9, 1999

[54] SELF-PROTECTED SERIES RESONANT ELECTRONIC ENERGY CONVERTER

[76] Inventor: Andrzej Bobel, 201 Norman Ct., Des Plaines, Ill. 60016

[21] Appl. No.: 08/556,643

[22] Filed: Nov. 13, 1995

Related U.S. Application Data

[63] Continuation-in-part of application No. 08/263,934, Jun. 21, 1994, abandoned, which is a continuation-in-part of application No. 08/009,404, Jan. 27, 1993, which is a continuation-in-part of application No. 07/840,288, Feb. 24, 1992, abandoned.

[51] Int. Cl.[6] ..................................................... H05B 37/02
[52] U.S. Cl. ..................... 315/209 R; 315/219; 315/205; 315/DIG. 7; 331/113 A
[58] Field of Search ............................... 315/209 R, 312, 315/219, 205, 226, DIG. 7; 331/113 A; 363/34, 37

[56] References Cited

U.S. PATENT DOCUMENTS

| | | | |
|---|---|---|---|
| 4,392,087 | 7/1983 | Zansky | 315/DIG. 4 |
| 4,855,860 | 8/1989 | Nilssen | 315/307 |
| 5,130,610 | 7/1992 | Kakitani | 315/219 |

*Primary Examiner*—Michael B Shingleton
*Attorney, Agent, or Firm*—Brian M. Mattson; Patents & TMS, P.C.

[57] ABSTRACT

An energy conversion device has a self-oscillating transistorized L-C series-resonant half-bridge inverter circuit having alternating resonant inductor current and adapted to deliver a high frequency signal to an effective load coupled effectively in parallel with the capacitor. The device includes a DC voltage supply able to provide DC voltage between the DC terminals; an artificial load arrangement connected to the DC terminals and operable to effectively couple itself in parallel with the capacitor; a load-coupling transformer; and a saturable feedback transformer operable to sense the alternating resonant inductor current and to control and adjust the frequency of the oscillation in proportion to the effective load applied effectively in parallel with the capacitor.

13 Claims, 5 Drawing Sheets

FIG.5(a) ALTERNATE CONDUCTION OF TRANSISTORS
CIRCUIT OF FIG.1.
(WITH LAMP-LOAD IN STEADY STATE)

FIG.5(b) ALTERNATE CONDUCTION OF TRANSISTORS IN CIRCUIT OF FIG.1.
(WITHOUT LAMP-LOAD, IN STEADY STATE)

FIG.5(c) ALTERNATE CONDUCTION OF TRANSISTORS IN CIRCUIT OF FIG.1.
(WITH OUTPUT SHORTED)

SELF-PROTECTED SERIES RESONANT ELECTRONIC ENERGY CONVERTER

CROSS-REFERENCE TO RELATED APPLICATIONS

This application is a continuation-in-part of U.S. patent application Ser. No. 08/263,934 filed Jun. 21, 1994, now abandoned, which is continuation-in-part of U.S. patent application Ser. No. 08/009,404 filed Jan. 27, 1993, which is continuation-in-part of U.S. patent application Ser. No. 07/840,288 filed Feb. 24, 1992, now abandoned.

BACKGROUND OF THE INVENTION

1. Field of the Invention

This invention relates to electronic ballasts for gas discharge lamps, particularly to ballasts wherein the load is powered by way of a series-resonant parallel loaded L-C circuit.

2. Description of Prior Art

Every high frequency electronic ballast for gas discharge lamps has a fundamental part in its structure adapted to convert the low frequency AC power line voltage to a high frequency source which starts and operates the lamps. That part is the L-C resonant inverter/converter circuit.

The electronic energy converters are known in many forms (configurations) dependent on specific applications. Each specific application of the electronic energy converter in electronic ballasts designs is associated with a specific set of requirements of the marketplace to be accepted commercially. In general, to meet industry requirements, the electronic ballast for a gas discharge lamp has to meet the following fundamental requirements: (i) draw power from a power line at a power factor of at least 90%, (ii) draw current from the power line with total harmonic distortion of less than 20%.

The electronic ballast is used in large quantities in lighting luminaries worldwide. The lighting industry in each country or continent has developed over some time a set of specific requirements recommended by the International Electrical Commission (IEC) or as required by safety standards of recognized safety organizations like UL in USA or CSA in Canada. In the US market, the electronic ballast technical specifications and requirements are outlined by the American National Standard Institute (ANSI). The most significant of the requirements are: a) lamp current crest factor should be less than 1.7, as specified by the lamps manufacturers to ensure long service life; b) lamp glow current before ignition should be lower than 25 mARMS, to make sure the filaments are not subjected to any other emission than thermionic; c) glow-to-arc transition time should be lower than 100 ms; d) positive ignition should occur within +/−20% of power line voltage; e) ballast should have standard wiring configurations for 1, 2, 3, or 4 lamps; f) ballast should pass high frequency shock hazard tests of safety standard (UL935); g) positive lamp ignition should occur at very low ambient temperatures, typically 0° C.; h) ballast EMI/RFI noise emissions shall be low—as per FCC, CFR Title 47, Part 18, Class A or B; i) ballast should be immune to power line transients; and j) lamp's filaments should be preheated up to the temperature of at least 700° C. before ignition.

Furthermore, there are market requirements related to the ballast features as follows:

A) protection ballast from self-destruction in the event of a lamps failure or removal and providing automatic restart after relamping;

B) circulating resonant current should be as low as possible to ensure miniaturization of the components and lowering the cost of the ballast;

C) circulating resonant current should be as low as possible to ensure highest electrical efficiency, lowest internal temperature rise, and longest ballast's service life possible;

D) protection from partial or total short circuit at the output terminals;

E) protection from commonly known cross-conduction of the switching transistors configured in a half-bridge by positive implementation of, so called, dead time and a zero-voltage switching method;

F) switching transistors' feedback loop signals quality should be completely independent of lamp-load current changes and disturbances;

G) switching transient voltage should not be present across the power switching junctions of the switching transistors;

H) all inverters, current waveforms should be as close as possible to harmonic (sinusoidal) in waveshapes to assure low radiated emissions;

I) circuitry should have low component count and be inexpensive and simple to manufacture;

J) the inverter design shall be very adaptable to all power line voltages and lamps kinds, as well as a number of lamps to be powered;

K) the design shall be easily manufacturable in large quantities with great repeatability as required by industry quality standards;

L) the design shall be insensitive to high and low ambient temperatures;

M) the design shall operate within specifications when smaller power rated lamps of the same group are connected as the load;

N) the design shall provide a very long service life—up 5 to 20 years.

There are two major directions (configurations) the electronic ballasts technologies have progressed over time. One of the configurations is L-C parallel-resonant "push-pull" type, as described in U.S. Pat. No. 104,277,726 issued to Burke. The other configuration is L-C series-resonant "half-bridge" type, as described in U.S. Pat. No. 3,084,283 issued to Grunwaldt. There are numerous deficiencies associated with any one of the configurations, as presented in respective patents.

The push-pull type having transistors connected in the parallel and across a DC voltage, exhibiting high transient voltage spikes across power switching junctions of the transistors—requiring the transistors in certain applications (like 347 VAC line in Canada), to have a very high voltage rating which is impossible to manufacture economically. Additionally, the switching transistors are switched periodically and alternately ON and OFF, in this push-pull configuration, according to a switching signal supplied to base-emiter junctions. That signal is proportional in its amplitude and phase to the resonant voltage developed at the resonant inductor L. That voltage is also applied to the lamp-load. Any undesired changes or distortions to that voltage created by the load are provided to the base-emiter junctions of the transistors. Thereby, the switching signal delivered to the base-emiter junctions in this push-pull inverter, does not always guarantee naturally good quality and reliable switching of the transistors.

The L-C series-resonant half-bridge type, having a load connected in parallel with the capacitor C, is self-destructive whenever the load is removed or inoperative. It is, however, a very robust circuit configuration in which no transient voltage spikes ever exist across power switching junctions of the transistors. Furthermore, it is common knowledge that application of the L-C series-resonant inverter to power a gas discharge load is particularly ideal in regards to the inverter's matching properties with those of the gas discharge load. Especially in regards to starting requirements and the waveform of the current supplied is particularly favorable in respect to life duration of the lamp (as described in U.S. Pat. No. 3,084,283 to Grunwaldt). In this inverter, where the lamp is connected across a resonant capacitor C, it is necessary to provide some means to protect the inverter from self-destruction when the lamp fails to ignite or is removed.

Unlike in the parallel-resonant inverter, all currents which flow within the L-C series-resonant inverter are near sinusoidal in waveshape, thus producing very low EMI/RFI noise emissions. The best switching reliability results are achieved whenever the transistors' switching signals (base currents) are proportional in their amplitudes and phases to the switched current (collector current). The switching loop of the L-C series-resonant inverter presented in U.S. Pat. No. 5,148,087, issued to Moisin et al., does not meet that fundamental requirement. The switching transistors, there, are switched with the use of a linear base drive transformer and the transistors' base currents are proportional in their amplitudes and in phases to the resonant capacitor current and are not proportional in their amplitudes and in phases to the switched current (the resonant inductor current). In result, such approach produced very unstable oscillations of the half-bridge inverter due to a mismatch of amplitude and phase of the switching signal in regards to switched current. Many failures of the ballasts made with such an invention are a result of a commonly known cross-conduction wherein both transistors are ON at the same time and get destroyed instantly.

In the paper presented by McMurray, Shattuck: "Silicon-Controlled Inverter with Improved Commutation" at the AIEE Summer General Meeting, Ithaca, N.Y., Jun. 18–23, 1961, the authors described a protection circuit for a series resonant inverter with use of so called "feedback rectifiers" to return energy to a DC source. (See FIG. 7, page 533). It was a great invention at the time, but it has several drawbacks when directly applied without further improvements. The most important drawback was that the inverter had a large magnitude of current circulated within itself whenever the load was removed or was inoperative, thereby causing high power dissipation, short service life, and low reliability. This mode of operation is very common in lighting installations, when a building contractor installs all ballasts before he installs the lamps into the lighting fixtures. It is mandatory that ballasts operate continuously without lamps or with defective/inoperative lamps and have a voltage present at its output terminals to re-strike and operate new or replaced lamps at all times. This operation must take place without performing additional tasks like power cycling OFF and ON, and the like. Also, lamps naturally fail at the end of their service life, and a ballast operates in the unloaded mode until the new lamps are installed, sometimes for a very long time. In order to provide a very long service life of the ballast (near 20 years), the ballast power dissipation or circulating resonant current of the inverter had to be minimized, especially in worst case fault modes. The minimized circulating resonant current allows miniaturization and reduction in manufacturing cost of the ballast.

Furthermore, gas discharge lamps behave like "uncharged capacitors" filled with gas before ignition. Their negative resistance characteristics, along with their ability to store energy, create a very unusual and difficult load to operate by the ballast. Also, due to various reasons, such lamps behave as rectifiers when they conduct current only in one polarity direction, and store energy in another polarity direction of the supplied voltage. Therefore, for many of the brief periods, such lamps create a short circuit across ballast output terminals, and for other brief periods, such lamps create no load conditions for the ballast. With such a violent and unpredictable load being operated, the ballast must withstand all its changes and behaviors: full load, partial load, short output, open output, partial load in diode mode, and all possible combinations of the latter. All electronic ballasts should respond to all of these faults naturally, dynamically, automatically, and instantly in order to achieve proper quality and reliability levels and to be accepted by the marketplace. In other words, all electronic ballasts must naturally be self-protective and self-adjusting in response to all lamp-load behaviors and all lamp-load conditions.

To mitigate the above described deficiencies of L-C series-resonant electronic ballasts, various protection circuits have been developed and described in a number of U.S. Patents.

In the U.S. Pat. No. 4,438,372 Zuchtriegel teaches an L-C series-resonant transistorized oscillator circuit operating multiple lamps. The transistors (T1, T2) are deenergized in case of malfunction by a monitoring circuit (11, L4, L4', L4") which includes a thyristor (21) which fires to disable oscillatory operation of the oscillator circuit and thereby prevents over voltage conditions upon electrical removal of a lamp. The transistors' switching signals are provided by windings L2, L2', and L3, L3' which are magnetically coupled to the resonant inductors L1, L1', respectively. Such switching signals are not in phase with the switched current, therefore complex phase shifting circuits must be implemented to improve the switching quality. This inverter has no protection for a partially or totally shorted output which is naturally associated with gas discharge lamps.

In U.S. Pat. No. 4,547,706, Krummel describes an L-C series oscillating inverter circuit equipped with a voltage dependent resistor to sense an overvoltage condition. Such a resistor functions in the current-conducting range, i.e. lamp ignition mode, when the oscillating frequency is altered to increase output voltage to a predetermined limit. Whenever the circuit output voltage is excessively high for a prolonged time, the voltage dependent resistor activates an inverter shutdown circuit to stop oscillations and remove the overvoltage condition. The shutdown stage is maintained until the interruption of the holding current of the thyristor. The inverter switching transistors are driven by signals provided by a saturable current transformer which responds to the current of the resonant inductor L. In U.S. Pat. No. 4,616,158, Krummel teaches again the shutdown circuit applied in an L-C series-resonant inverter in case of overvoltage or overcurrent.

In U.S. Pat. No. 5,049,790, Herfurth et al. describes a method of externally driving an L-C series-resonant inverter wherein predetermined adjustments of the oscillation frequency are provided for all operation conditions, i.e. normal operation, strike mode, and lamp removed mode. The external driver (integrated circuit) is supplied with the inverter output voltage signal and lamp current signal to effectively perform the transistors' driving and frequency controlling functions.

In U.S. Pat. No. 5,099,407, Thorne describes a complex runaway protection circuit which is activated upon sensing of a no load condition to place the L-C series-resonant inverter circuitry in a standby mode of operation and further controls the output power (voltage and current) with use of circuitry to increase the frequency of the inverter oscillation. To assure that over-voltage or over-current in the circuit will not take place, the protection circuit 24 is provided to effectively change the oscillating frequency and the transistors' duty cycles. The switching transistors are driven with use of a linear base drive transformer which is sensing the resonant inductor current and is additionally coupled to the protection circuit 24 whenever an increase of the oscillation frequency is performed. This approach provides effective dimming of the lamps, but fails to effectively protect the inverter in the case of a lamp diode mode of operation (asymmetrical lamp current) and partially or totally shorted output conditions.

In U.S. Pat. No. 5,130,610, Kakitani describes a L-C series resonant inverter having a load connected in parallel with the resonant capacitor 60 with use of an isolation transformer 66 to effectively minimize the circulating current during normal load conditions. Kakitani states that, with the decrease of the value of the circulating resonant current the miniaturization and reduction in manufacturing cost of an apparatus can be realized. The transformer 84 (FIG. 7) is equipped with a winding 90 for output voltage detection and supplying a proportional signal to control a switching transistor's frequency via the control circuit 94 and safety circuit 96. In another U.S. Pat. No. 5,175,474, Kakitani teaches sensing output voltage of the inverter with a winding 11c and a resonant inductor voltage with winding 7b. Both sensed voltages are provided to the control circuit 8 which accordingly gate the transistors 5 and 6 to eliminate over-voltage condition whenever lamps are removed or are inoperative. Such a control method and circuitry is costly and very complicated to be effective in all conditions including a partially or totally shorted output.

U.S. Pat. No. 4,392,087, which issued to Zansky, describes a single magnetic structure which includes an input winding (primary) 127, an output winding (secondary) 132, a clamping winding 145, and transistors' base drive windings 122 and 128. All windings have their associated primary inductances. The mutual inductances are naturally present between each possible pair of windings of that structure. The mutual magnetic coupling is not ideal; therefore, leakage inductances associated with each winding are also naturally present. The leakage inductance of the output winding 132 is intentionally made to be as the resonant inductance of this complex resonant circuit. In this structure, the resonant capacitor 136 is in series-resonanse with the leakage inductance and in parallel-resonanse with the primary inductance of the winding 132. The clamping winding 145 is proposed to protect the output of the inverter (across the capacitor 136) from over-voltage and over-current conditions. Due to a fact that the clamping winding is placed on the same structure as all other windings of the inverter, its clamping effect is distributed on all windings according to a coupling factor (0<k<1) which exists between this clamping winding and any other winding of this single magnetic structure. The transistors' base drive signals are greatly effected by the current flowing in the clamping winding during clamping time, and the switching quality is not acceptable at that time. If fact, this applicant has built the inverter according to teachings of Zansky with intentions to operate two lamps FO32T8 type. During the critical test, when the load was removed, the transistors failed within one second. After redesigning the circuit to create more effect of clamping during load removed mode, the ballast failed to provide adequate voltage to strike the lamps in the first place. This applicant concluded that, such application of a clamping winding as proposed by Zansky, is absolutely impractical in its purpose. Perhaps, it is the reason why this type of inverter never has been manufactured as an an electronic ballast.

Another approach is described in U.S. Pat. No. 4,855,860 which issued to Nilssen wherein a temporary clamp circuit made with diodes Rx, Ry and capacitors Cx, Cy and have voltage across the resonant inductor L limited in regards to the voltage across the capacitors Cx, Cy with use of a tap TP in the inductor winding. The inductor, therefore, has two sections. Whenever voltage across the section with terminals Z and TP is at a level higher than a voltage across the capacitor Cx, Cy, then high peak current will circulate in that section of the inductor winding. Due to magnetic coupling (0<k<1) between both sections of the inductor (it is made on the same magnetic structure), a proportionally high peak current will be inducted in the second section of the inductor, resulting in high peak current flow in addition to normal resonant circulating current. Such high peaks fare developed at the time when the resonant circulating current is normally crossing zero. This develops high peak transistors' base drive currents at the time when such transistors are to be turned OFF. In result, the dead time between conduction of both transistors is eliminated which leads the transistors closer to cross-conduction and closer to system crush. This type of clamping method of the series-resonant inductor L, having a lamp-load applied across the resonant capacitor C, does not protect the inverter for longer than a brief period. Perhaps it was the only reason why Nilssen proposed an additional protection means in the form of an inverter total shutdown circuit. In fact, in U.S. Pat. No. 4,461,980, Nilssen teaches the same combination of clamped inductor with a total shutdown circuit in case of an unload condition. Furthermore, Nilssen teaches the total inverter shutdown circuits in many of his other U.S. Pat. Nos. as follows: 4,503,363, Re32,901, Re32,953, 4,581,562, 4,638,395, and 4,667,131. In contrast, Nilssen does not suggest any clamping circuit without combining it with a total shutdown circuit for all L-C series resonant inverters.

Additionally, Nilssen teaches other methods of controlling an L-C series-resonant inverter having a lamp-load connected in parallel with the resonant capacitor C. Such teachings can be found in the following U.S. Pat. Nos. 4,700,287, 4,819,146, 4,851,739, 4,983,887, 5,039,919, 5,111,380, 5,164,637, 5,177,409, and 5,179,326.

Therefore, it is very desirable to have an electronic ballast having a L-C series-resonant inverter, and having a gas discharge load connected in parallel with a capacitor C, and the inverter shall be protected from over-voltage and over-current, and further the inverter shall be equipped with means to minimize the magnitude of the circulating current, when the gas discharge load is removed or is inoperative, to effectively miniaturize the components' sizes and lower the device costs. Further, the minimum of the circulating current lowers internal power dissipation within the inverter and increases the service life and the reliability of the ballast. It is very desirable to have an improved L-C series-resonant inverter/converter implemented into a design of the electronic ballast for gas discharge lamps which will be greatly improved and novel to satisfy a series of fundamental requirements described herein.

Also, it is extremely important to have an electronic ballast which will safely withstand all unpredictable and predictable behaviors of the operated gas discharge load.

SUMMARY OF THE INVENTION

Objects of the Invention

A general object of the present invention is that of providing an improved L-C series-resonant inverter implemented into a design of the electronic ballast for gas discharge lamps which will be robust, greatly improved, and novel.

It is an object of my invention to provide an improved structure of an L-C series-resonant inverter in which all currents are near sinusoidal in waveshape and its EMI/RFI noise emissions are low.

Another object of my invention is to provide an improved structure of an L-C series-resonant inverter in which switching transient voltages are not present across power switching junctions of the switching transistors.

Another object of my invention an to provide an improved structure of an L-C series-resonant inverter in which switching transistors' feedback loop signals are completely independent of lamp-load current changes or disturbances.

A further object of my invention is to provide an improved structure of an L-C series-resonant inverter in which switching quality guarantees protection from transistors' cross-conduction and destruction.

It is also an object of my invention to provide an improved structure of an L-C series-resonant inverter which will be self-protected from self-destruction in the event of lamp's failure or removal, and provide automatic restart after relamping. The inverter of my present invention will provide a high frequency voltage source having magnitude and frequency of the output voltage dependent and proportional to applied load.

It is yet another object of my invention to provide an improved structure of an L-C series-resonant inverter in which the circulating resonant current will be minimized to ensure miniaturization of the components, lowering cost of the ballast, highest electrical efficiency, lowest internal temperature rise, and longest ballast's service life possible.

A further object of my invention is to provide an improved electronic ballast which will safely withstand all forms and predictable or unpredictable changes and behaviors of the gas discharge load. In accordance with one of the principal features of my invention, the electronic ballast will respond naturally, dynamically, automatically, and instantly to all forms of lamp-load, as follows: full load (nominal), partial load, shorted output, partially shorted output, open output (no load), partial load in diode mode, and all other possible combinations.

It is another feature of the electronic ballast of my invention which will naturally and automatically self-adjust to operate multiple lamp types of various power levels and sizes within proper specifications.

It is yet another feature of the electronic ballast of my invention that it may be adapted to any power line voltages and lamps kinds, as a well as number of lamps to be powered.

Another object of my invention is to provide a simple L-C series-resonant electronic ballast which has low component count and is inexpensive and simple to manufacture.

According to yet another advantage of my invention, it is possible to achieve the design of an improved electronic ballast which will exhibit a very long average service live —up to 20 years.

These, as well as other objects, features and advantages of the present invention will become apparent from the following description and claims.

BRIEF DESCRIPTION

According to the present invention, there is provided an energy conversion device for powering at least one gas discharge lamp and comprising:

- a DC voltage supply means having first and second DC terminals;
- a capacitor means connected in series across the DC terminals, and having a first inverter terminal;
- an inverter means having a second inverter terminal and having a first and a second transistor means connected in series across the DC terminals, and said transistor means being equipped with control terminals and being operative to periodically and alternately render in an ON-state and in an OFF-state, said ON-state being characterized by an ON-time during which the transistor means exhibit a relatively low resistance to the flow of electric current, and said OFF-state being characterized by an OFF-time during which said switching means exhibit a relatively high resistance to the flow of electric current, the inverter means being operative to convert said DC voltage into a substantially square-wave voltage, said squarewave voltage having a frequency and being provided between the first and the second inverter terminals;
- series-resonant circuit means having an instantaneous frequency dependent impedance and comprising a resonant capacitor and a resonant inductor, connected in series circuit across the first and the second inverter terminals and operative to draw an alternating resonant current from said inverter terminals;
- load-coupling means operative to permit connection of said lamp in parallel circuit with the resonant capacitor, and to provide a predetermined magnitude of power to properly preheat and operate said lamp;
- an artificial load means having an instantaneous effective value and operative, whenever said lamp is not effectively connected in parallel with said resonant capacitor, to effectively connect itself in parallel circuit with the resonant capacitor; and
- a saturable feedback transformer means having a sensing winding and a pair of control windings, and operable to sense an instantaneous amplitude of the alternating resonant current of the resonant circuit means, and to provide a control signal at the control terminals to determine and control said ON-time and frequency in proportion to an instantaneous resonant impedance developed in natural and resonant interaction between: (i) a load impedance of the lamp, and (ii) the instantaneous effective value of the artificial load means, and (iii) the frequency dependent impedance of the series-resonant circuit means;
- wherein the saturable feedback transformer means being operable, at the time whenever said lamp is being effectively disconnected from the parallel connection with the resonant capacitor, to increase the frequency up to a predetermined and adjustable magnitude, and that increase is proportional to an increase of an effective value of a load applied in parallel with the resonant capacitor.

The device further comprising the capacitor means as polarized capacitors electrolytic type.

The device further comprising the transistor means as npn bipolar transistors.

The device also comprising the load-coupling means a load-coupling transformer which has a primary winding equipped with an intermediate terminal and the primary winding is connected across the resonant capacitor, and said load-coupling transformer has a secondary winding to which the lamp is connected.

The device yet further comprising the artificial load means as diode means coupled between the intermediate terminal of the primary winding and the DC terminals of the DC voltage supply means.

The device of the present invention comprising the saturable feedback transformer means as saturable current transformer made with a toroidal core of ferrite material with permeability of at least 5000, and in size of approximately 6 millimeters in outside diameter, 3 millimeters in height, and 3 millimeters in inside diameter, and wherein the saturable current transformer turns ratio of sensing winding to control winding being 1 to 3, or 1 to 4, or 2 to 3.

In such a device, by providing a saturable feedback transformer in combination with the artificial load capable to effectively connect itself in parallel with the resonant capacitor, the frequency will always adjust itself throughout the variation of the DC voltage and associated with its variation of the artificial load effective value. The frequency of oscillation of the electronic converter of the preferred embodiment will be proportional to the value of the effective load applied across the resonant capacitor. Thus, the magnitude of the circulating resonant current throughout the variation of the effective value of the artificial load, will be always adjusted to be at its minimum magnitude to provide for maximum efficiency of the device.

DESCRIPTION OF THE PREFERRED EMBODIMENTS

Details of Construction

Figure 1:
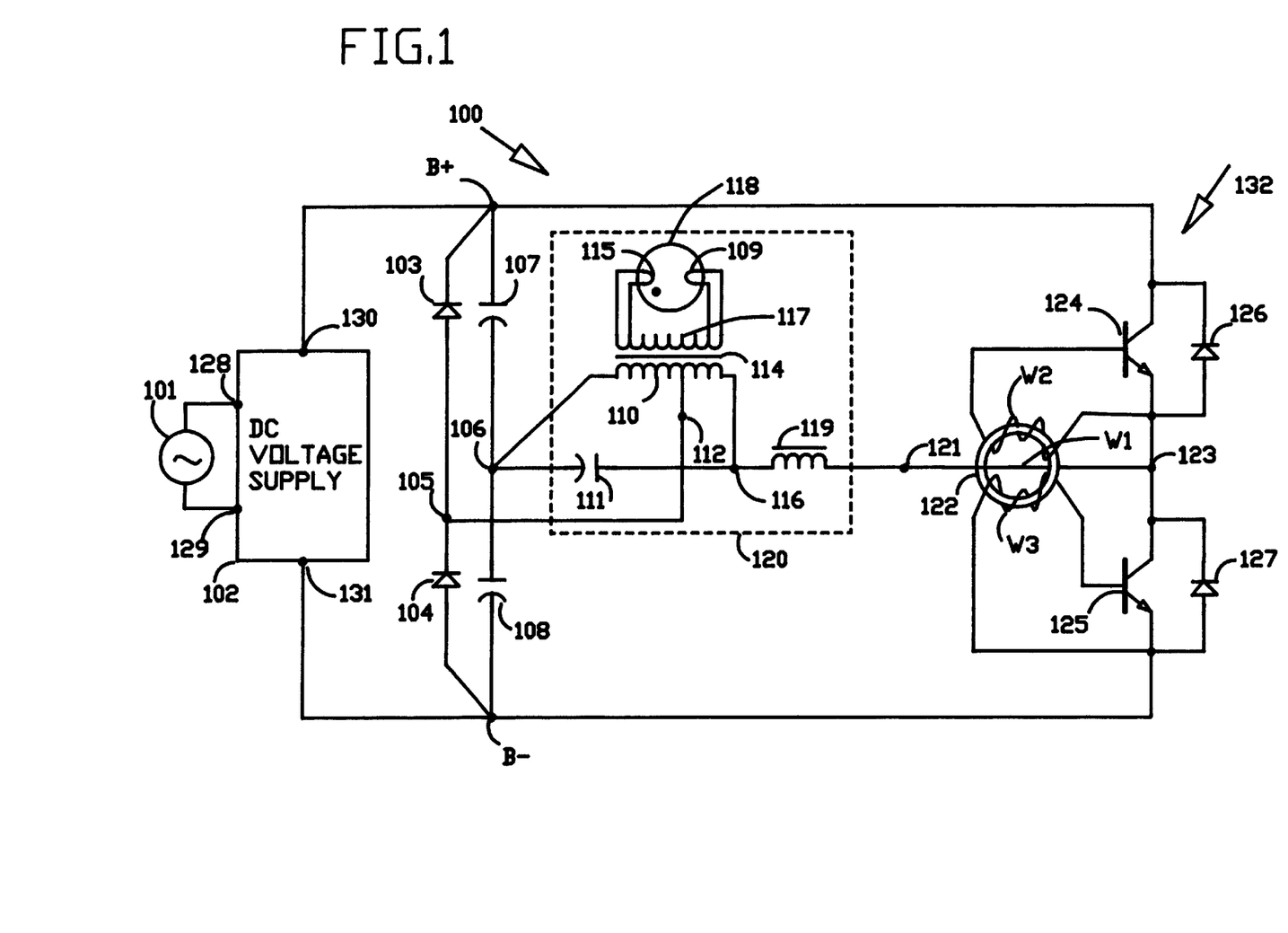
FIG. 1 illustrates the invention in its preferred embodiment.

FIG. 1 schematically illustrates the electrical circuit arrangement of the preferred version of the present invention.

In FIG. 1, a circuit 100, for powering a gas discharge lamp 118, has two DC input terminals B+,B− for receiving thereacross a DC voltage.

A DC voltage supply 102 receives at its input terminals 128, 129 a voltage from AC voltage supply 101 which is an ordinary power line and produces therefrom a DC voltage at output terminals 130, 131. The output terminals 130, 131 are connected to the input terminals B+,B−, respectively.

A half-bridge inverter 132 has a bipolar transistor 124 (of the type MJE 13005) connected at its collector electrode to the positive DC input terminal B+. The transistor 124 has its emitter electrode connected to a node 123. A further transistor 125 (like the transistor 124, of the type MJE 13005) of the inverter 132 has its collector electrode connected to the node 123. The transistor 125 has its emitter electrode connected to the negative DC input terminal B−. Two capacitors 107, 108 (having equal values of approximately 47 uF) are connected in series between the DC input terminals B+,B− via a node 106.

A series-resonant circuit 120 has a capacitor 111 and an inductor 119 connected in series between the node 106 and a node 121 via a node 116.

A saturable feedback transformer 122 has a primary winding W1 (having one turn) and two secondary windings W2, W3 (each having 3 turns) wound on a magnetic core. The primary winding W1 of the transformer 122 is connected in series with the inductor 119 between the node 121 and the node 123. The secondary winding W2 is connected between a base-emitter junction of the transistor 124. The secondary winding W3 is connected (with opposite polarity with respect to the secondary winding W2) between a base-emitter junction of the transistor 125.

A diode 126 has its cathode connected to the collector electrode of the transistor 124 and has its anode connected to the node 123. A further diode 127 has its cathode connected to the node 123 and has its anode connected to the emitter electrode of the transistor 125.

A load-coupling transformer 114 has its primary winding 110 connected in series with the inductor 119 and in parallel with the capacitor 111. The primary winding 110 of the transformer 114 is intermediately tapped at a node 112.

A diode 103 has its cathode connected to the terminal B+ and has its anode connected to the node 112. A further diode 104 has its cathode connected to the node 112 and has its anode connected to the terminal B−.

The load-coupling transformer 114 has a secondary winding 117 magnetically coupled to the primary winding 110.

A gas discharge lamp-load 118 is connected across the secondary winding 117.

Figure 2:
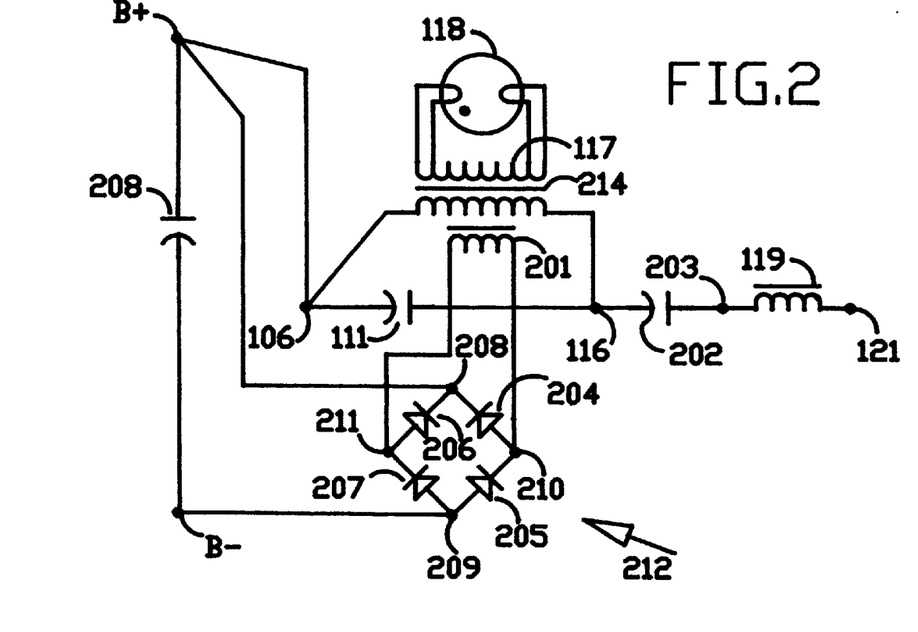
FIG. 2 illustrates the alternative version of the device of FIG. 1.

FIG. 2 illustrates an alternative version of the preferred embodiment of FIG. 1. The capacitor 107 is replaced by DC blocking capacitor 202 connected between the resonant capacitor 111 and the resonant inductor 119. The load-coupling transformer 114 has now a second secondary winding 201 magnetically coupled with the primary winding 110. A bridge 212 of four diodes 204, 205, 206, 207 has AC terminals 210, 211 connected to the winding 201, and DC terminals 208, 209 connected to terminals B+,B−.

Figure 3:
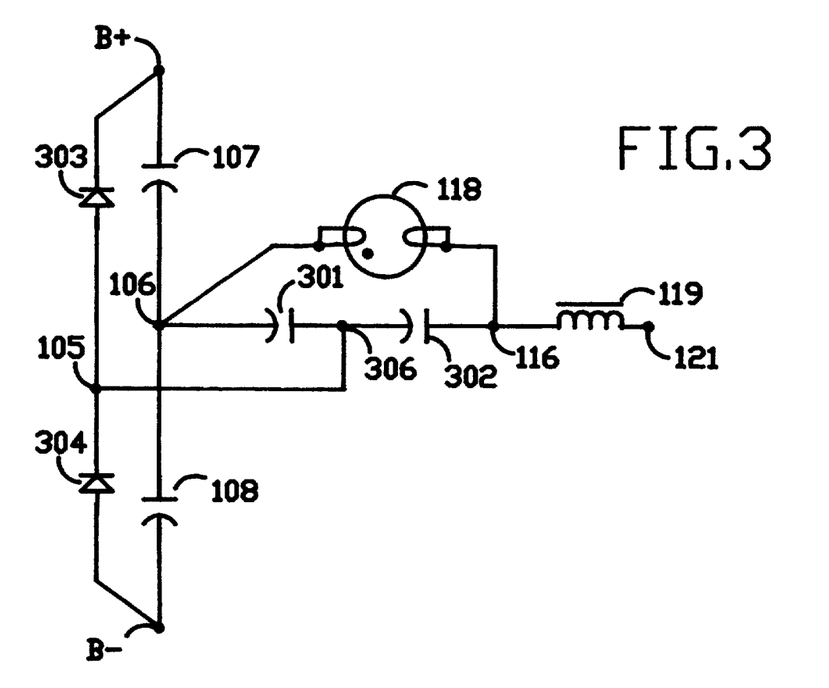
FIG. 3 illustrates yet another alternative version of the invention as its third embodiment.

FIG. 3 illustrates a non-isolated alternative version of the preferred embodiment. The load-coupling transformer 114 is now eliminated. The gas discharge lamp-load 118 is directly connected across terminals 106,116. The resonant capacitor 111 of FIG. 1 is now divided into two capacitors 301, 302 serially-connected between terminals 106, 116 via a node 306. The node 306 is connected to the node 105.

Figure 4:
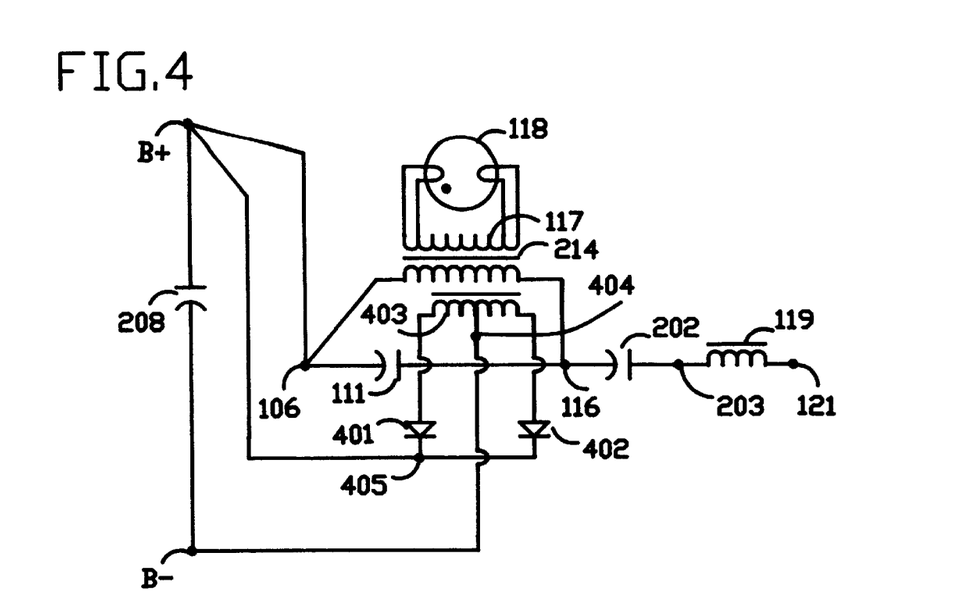
FIG. 4 illustrates an alternative version of the invention described in FIG. 2.
Figure 5A:
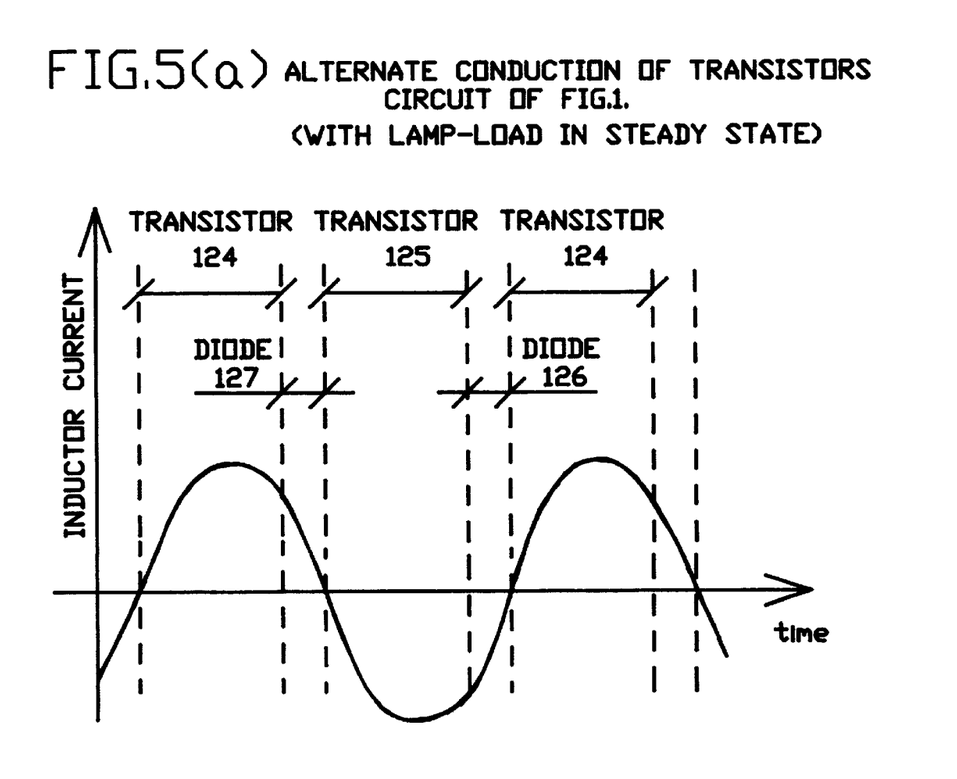
FIGS. 5(a)–5(c) show various current waveforms associated with the operation of the device of the present invention.
Figure 5B:
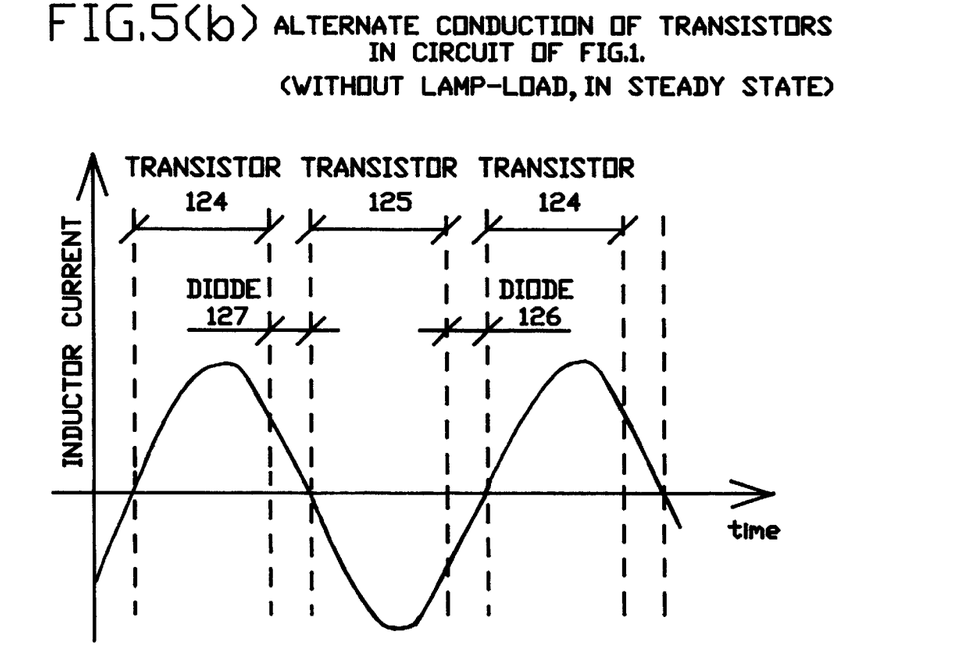
Figure 5C:
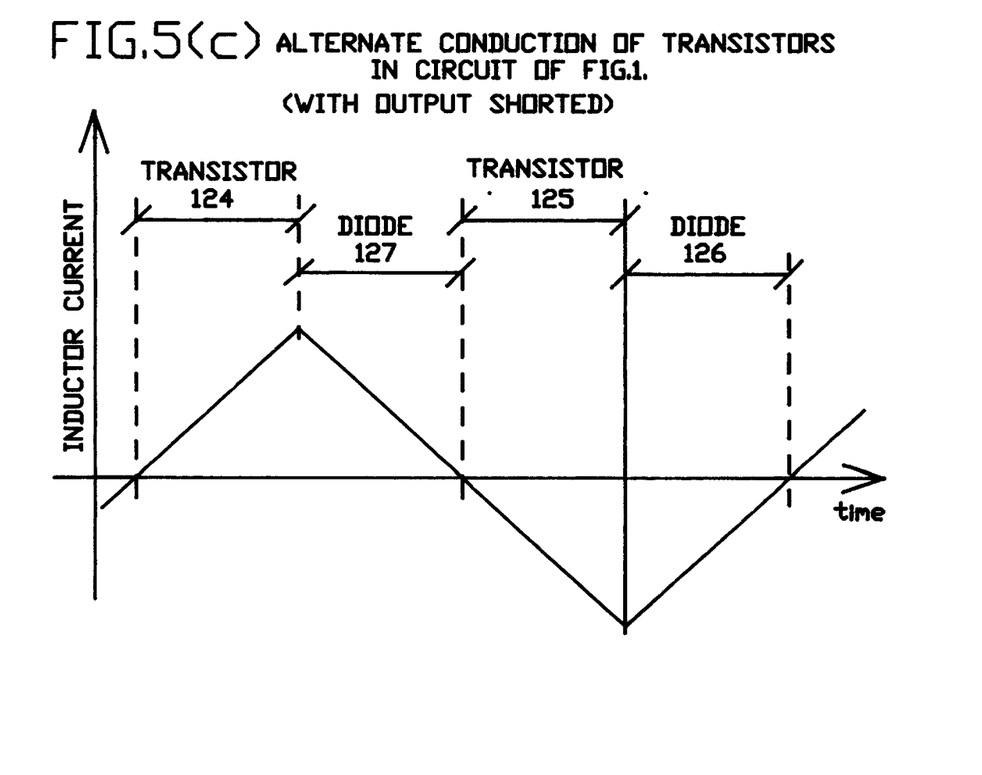

FIG. 4 illustrates yet another alternative version of the embodiment of FIG. 2. The bridge 212 is here replaced with two diodes 401, 402 connected to the ends of the second secondary winding 403. That winding 403 has an intermediate node 404 which is connected to the terminal B−. A cathode electrode of the diodes 401, 402 are connected into a node 405 and connected to the terminal B+.

Figures 6A, 6B, 6C:
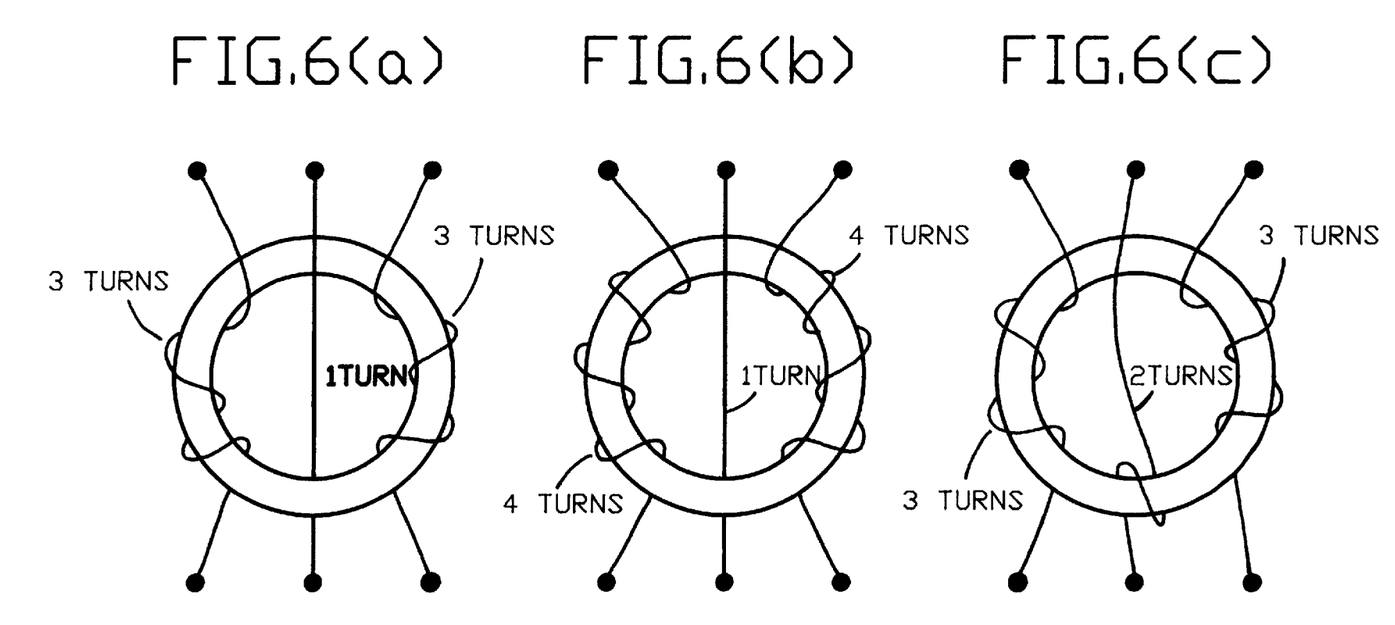
FIGS. 6(a)–6(c) illustrate alternative constructions of the significantly important component part of the invention.

FIGS. 6(a)–6(c) illustrate alternative versions of winding the saturable feedback transformer 122. These versions are practical solutions in construction of the electronic ballast of the present invention with transistors manufactured by various companies. Each company manufacturing its transistors with unique parameters i.e. gain, storage time. Therefore, to accommodate usage of all transistors' brands in the manufacturing process, the modified saturable feedback transformers are needed, as described herein.

DETAILS OF OPERATION

The device of FIG. 1 is triggered into oscillation by an ordinary triggering circuit (not shown). At power-up, the resonant inductor 119 and capacitor 111 resonantly interact and the device will draw an alternating current from the DC input terminals B+,B+. The saturable feedback transformer 122 provides a feedback signal to the transistors 124, 125. Thus, the device starts to oscillate and relatively high voltage is being developed across both resonant elements 111, 119. At any time when the peak magnitude of the voltage between nodes 106 and 112 of the load-coupling transformer 114 reach the level of DC voltage being present between the node 106 and the terminal B+, the peak magnitude of the voltage across the resonant capacitor 111 is limited at that DC voltage level. Also, the voltage applied to the load 118 is limited at the magnitude proportional to that level and is predetermined, as per turns ratio of the transformer 114. The voltage applied to lamp-load 118 makes the lamp strike and voltages across secondary winding 117 and primary winding 110 become lower accordingly. Also, the oscillation frequency (fo) becomes significantly lower than natural resonant frequency (fn) of the inductor 119 (L) and capacitor (C) without any load R applied. The oscillation frequency can be expressed by the following formula:

$$fo = \frac{1}{2\pi}\sqrt{\frac{1}{LC} - \frac{1}{4R^2C^2}} \quad (1)$$

where::
L=inductance of the resonant inductor 119;
C=capacitance of the resonant capacitor 111;
R=effective value of a load applied across the capacitor 111. The natural resonant frequency of the same inductor (L) and the same capacitor (C), without any load R applied, will be as follows:

$$fn = \frac{1}{2\pi}\sqrt{\frac{1}{LC}} \quad (2)$$

When the lamp-load is removed out of its holders or fails to operate, as will be at the end of its service life, the output voltage across the capacitor 111 will rise. This can be translated to a rise of the value of the effective load R (see formula "1" above) applied across the resonant capacitor 111, and resonant circulating current (current in the inductor 119) will increase accordingly, as this is a natural behavior of a series-resonant circuit. The increased current in the inductor 119 will create increased voltage across winding W11, and the saturable feedback transformer 122 will saturate sooner than would in oscillations with lamp-load 118 normally operating. In result, the frequency of oscillations fo will increase to a predetermined level which corresponds to the increased value of the effective load applied across capacitor 111 by coupling the voltage across nodes 106, 112 to the DC voltage present across capacitor 107 for a positive half-sinewave, and to DC voltage present across the capacitor 108 for a negative half-sinewave. The increase of the oscillation frequency fo makes the impedance of the resonant inductor ($X_L=2\Pi foL$) to increase proportionally, and the circulating resonant current will decrease accordingly. Then, the magnitude of limited voltage at the output terminals remains constant at the high and predetermined limit because the voltage output magnitude change is independent of frequency change. The circuit's Q-factor is high enough to produce voltage at the output always up to the high and predetermined limit. Due to such natural, dynamic, and self-adjusting interaction between the saturable feedback transformer and series-resonant circuit as described above, the resonant circulating current always settles at its minimum for the particular and predetermined magnitude of the output voltage. Therefore, internal power dissipation of the inverter of the present invention, always will be at its minimum, as well. Furthermore, in the inverter constructed as described herein, the self-adjustment (increase) of the frequency is proportional to a predetermined increase of the effective load value applied across the capacitor 111, and the load can be either as: (a) the normal lamp-load (in stable mode of operation of the device), (b) an artificial load arrangement (an effective load when the gas discharge lamp-load is completely removed out of the device), or (c) any combination of the normal load and the artificial load arrangement (when the gas discharge lamp-load is partially removed, as will be in a multiple lamp ballast, when some of the lamps will be removed and other lamps will still operate with reduced light output).

The artificial load arrangement will be instantly, automatically, and effectively connected across the capacitor 111 due to natural characteristics of a diode, as a switching element.

The artificial load arrangement as described herein will provide for control of the series-resonant circuit 120 with a predetermined and adjustable magnitude of the effective load applied across the capacitor 111. The adjustable magnitude of the effective load is implemented by providing between terminals B+,B− an adjustable magnitude of the DC voltage, as may be supplied by DC voltage supply 102. Thus, the voltage applied to strike the lamp-load 118 can be adjustable in its magnitude to provide: a particular predetermined voltage for proper preheating of the filaments 115, 109, but not high enough to strike the lamp 118, and, after a predetermined and adjustable time period, other particular predetermined voltage sufficient to strike the lamp. Thereby, the preheating of the filaments and lamps strike will be controlled in time and in magnitude, as desired to provide for long lamp life. The DC voltage supply may be made as an ordinary boost, buck, or buck/boost converter operable to deliver to the DC input terminals the DC voltage with a magnitude of a step function fully controllable in time.

Also, whenever the DC voltage supplied between terminals B+, B− is reduced below a particular level, so the voltage present across gas discharge load 118 in a stable mode of operation will be of higher peak magnitude then magnitude of the voltage across the capacitor 107 or the capacitor 108, the power delivered to the gas discharge lamp-load 118 will decrease, and therefore to effect dimming of the lamp-load. The effective value of the load (R) applied across the capacitor 111 in the dimming mode is the combination of gas discharge lamp-load 118 and the artificial load.

The saturable feedback transformer design, as per FIGS.6(a)–6(c), is made with ferrite core material "J" or "W" by Magnetics, and size (toroid of dimensions 6×3×3 mm) to guarantee that the switching signal provided at the transistors' bases has its amplitude and phase at such values that guarantees switching of the transistors without possibility of cross-conduction in any of the modes of operation of the device. The modes of operation are: (a) full load (stable operation), (b) partial load, (c) shorted output, (d) partially shorted output, (e) open output (no load), (f) partial load in diode mode, and all other possible combinations. When the device is operated in an output shorted mode, the saturable feedback transformer protects the converter from destruction by its natural saturation characteristics when it reverses the drive signal delivered to transistors alternately and periodically—each time after a predetermined (natural) time constant. When in the shorted output mode, the inverter oscillates in a non-resonant mode, and the inductor current is rising linearly from zero in each half-cycle and flows in that half-cycle until the saturable feedback transformer saturates, as per FIG. 5 (c). Any other non-saturating feedback transformer would not protect the inverter in this short output mode, because it will not saturate before the inductor current will reach destructive magnitude for the first transistor whichever will conduct that current.

It will be appreciated that although in FIG. 1 there has been described a circuit for powering one fluorescent lamp, the invention is not restricted to powering of the one lamp. It will be understood that the invention is also applicable to circuits for powering other number and/or types of lamps from all level of voltages of the power lines in the world.

It will be appreciated that the application of a saturable feedback transformer in combination with the artificial load arrangement in the L-C series-resonant inverter of my invention permits operation of many different types of lamps by the same electronic ballast model. For example: electronic ballast designed for two (2) lamps FO32T8 32 Watt type, will also operate two (2) FBX40TT5 40 Watt type lamps, or two (2) FO25T8 25 Watt type lamps, or two (2) FO17T8 17 Watt type lamps, or two (2) FBX18TT5 18 Watt type lamps, or one (1) F40BXTT5 40 Watt type lamp, or one (1) FO32T8 32 Watt type lamp, or one (1) F28W2D 28 Watt type lamp, or one (1) F40T10 40 Watt type lamp, or one (1) F40T12 40 Watt type lamp, and all within their technical specifications. The self-adjustment of the inverter's internal impedance to regulate power delivery to the lamps is performed naturally, dynamically, and instantly by self-adjustment of the oscillation frequency in proportion to the effective load value (impedance of each lamp type) applied at the inverter output terminals (winding 117).

It will be appreciated that application of the saturable feedback transformer in combination with the artificial load arrangement in the L-C series-resonant inverter is novel, unique, and essential to produce a simple and extremely robust inverter circuit which has natural advantageous characteristics when used in an electronic ballast for gas discharge lamps.

It will be appreciated that the present invention and its several attendant advantages and features will be understood from the preceding description. However, without departing from the spirit of the invention, changes may be made in its form, and in the construction, and interrelationships of its component parts, the form herein presented merely representing the preferred embodiment.

I claim:

1. An energy conversion device for powering at least one gas discharge lamp, the device comprising:

a DC voltage supply means having first and second DC terminals;

a capacitor means connected in series between the first and second DC terminals, and having a first inverter terminal;

an inverter means having a second inverter terminal and having a first and a second transistor means connected in series across the DC terminals, and said first and second transistor means equipped with control terminals and being operative to periodically and alternately render in an ON-state and in an OFF-state, said ON-state characterized by an ON-time during which the first and second transistor means exhibit a relatively low resistance to flow of electric current, and said OFF-state characterized by an OFF-time during which said first and second transistors means exhibit a relatively high resistance to the flow of electric current wherein the inverter means converts said DC voltage into a substantially squarewave voltage, said squarewave voltage having a frequency and provided between the first and the second inverter terminals;

a series-resonant circuit means having an instantaneous frequency dependent impedance and comprising a resonant capacitor and a resonant inductor, connected in a series circuit across the first and the second inverter terminals and operative to draw an alternating resonant current from said first and second inverter terminals;

a load-coupling means having a secondary winding connected to the lamp, a primary winding coupled to the resonant capacitor and an intermediate node wherein the load coupling means connects said lamp in a parallel circuit with the resonant capacitor and provides a predetermined magnitude of power to properly preheat and operate said lamp;

an artificial load means connected in parallel to the resonant capacitor via the intermediate node of the primary winding wherein the artificial load means has an instantaneous effective value and is operative whenever said lamp is not connected to the secondary winding of the load coupling means; and a saturable feedback transformer means having a sensing winding and a pair of control windings wherein the saturable feedback transformer means couples itself to the series resonant circuit means and to the artificial load means via its sensing winding that senses an instantaneous amplitude of the alternating resonant current of the series-resonant circuit means and provides a control signal at the control terminals to determine and control said ON-time and frequency in proportion to an instantaneous resonant impedance developed in natural and resonant interaction between: (i) a load impedance of the lamp, and (ii) the instantaneous effective value of the artificial load means, and (iii) the frequency dependent impedance of the series-resonant circuit means wherein the saturable feedback transformer means is operable at a time whenever said lamp is effectively disconnected from the parallel connection with the resonant capacitor to increase the frequency up to a predetermined and adjustable magnitude wherein that increase is proportional to an increase of an effective value of a load applied in parallel with the resonant capacitor.

2. The device according to claim 1 wherein the capacitor means comprises polarized capacitors of the electrolytic type.

3. The device according to claim 1 wherein the transistor means comprises npn bipolar transistors.

4. The device according to claim 1 wherein the load-coupling means comprises a load-coupling transformer which has a primary winding equipped with an intermediate terminal wherein the primary winding is connected across the resonant capacitor, and said load-coupling transformer has a secondary winding to which the lamp is connected.

5. The device according to claim 4 wherein the artificial load means comprises diode means coupled between the intermediate terminal of the primary winding and the DC terminals of the DC voltage supply means.

6. The device according to claim 1 wherein the saturable feedback transformer means comprises a saturable current transformer made with a toroidal core of ferrite material with a permeability of at least 5000, and in size of approximately 6 millimeters in outside diameter, 3 millimeters in height, and 3 millimeters in inside diameter wherein the saturable current transformer turns ratio of sensing winding to control winding being 1 to 3, or 1 to 4, or 2 to 3.

7. A ballasting means for at least one gas discharge lamp and adapted to be powered from an ordinary electric utility power line, the ballasting means comprising:

a DC voltage supply means having first and second DC terminals;

a capacitor means connected in series between the first and second DC terminals, and having a first inverter terminal;

an inverter means having a second inverter terminal and having a first and a second transistor means connected in series across the DC terminals, said first and second transistor means equipped with control terminals and operative to periodically and alternately render in an ON-state and in an OFF-state, said ON-state characterized by an ON-time during which the first and second transistor means exhibit a relatively low resistance to flow of electric current, and said OFF-state characterized by an OFF-time during which said first and second transistor means exhibit a relatively high resistance to the flow of electric current, the inverter means operative to convert said DC voltage into a substantially squarewave voltage, said squarewave voltage having a frequency and provided between the first and the second inverter terminals;

a series-resonant circuit means having an instantaneous frequency dependent impedance and comprising a resonant capacitor and a resonant inductor connected in a series circuit across the first and the second inverter terminals and operative to draw an alternating resonant current form said first and second terminals;

a gas discharge load means disconnectedly connected in parallel with the resonant capacitor;

an artificial load means connected in parallel to the resonant capacitor wherein the artificial load means has instantaneous effective value and is operative whenever said lamp is not connected to the resonant capacitor; and a saturable feedback transformer means having a sensing winding and a pair of control windings wherein the saturable feedback transformer means couples itself to the series resonant circuit means and to the artificial load means via its sensing winding and provides a control signal at the control terminals to determine and control said ON-time and frequency in proportion to an instantaneous resonant impedance developed in natural and resonant interaction between: (i) a load impedance of the lamp, and (ii) the instantaneous effective value of the artificial load means, and (iii) the frequency dependent impedance of the series-resonant circuit means wherein the saturable feedback transformer means is operable at the time whenever said lamp is effectively disconnected from the parallel connection with the resonant capacitor to increase the frequency up to a predetermined and adjustable magnitude wherein that increase is proportional to an increase of an effective value of a load applied in parallel with the resonant capacitor.

8. The device according to claim 7 wherein the resonant capacitor is in the form of two serially connected capacitors and having a second intermediate terminal therebetween.

9. The device according to claim 8 wherein the artificial load means comprises diode means coupled between the second intermediate terminal and the DC terminals of the DC voltage supply means.

10. An energy conversion device for powering at least one gas discharge lamp, the device comprising:

a DC voltage supply means having first and second DC terminals;

a capacitor means connected across the DC terminals and having a first inverter terminal;

an inverter means having a second inverter terminal and having first and second transistor means connected in series across the DC terminals wherein said first and second transistor means are equipped with control terminals and are operative to periodically and alternately render in an ON-state and in an OFF-state, said ON-state characterized by an ON-time during which the first and second transistor means exhibit a relatively low resistance to flow of electric current, and said OFF-state being characterized by an OFF-time during which said switching means exhibits a relatively high resistance to the flow of electric current, the inverter means operative to convert said DC voltage into a substantially squarewave voltage, said squarewave voltage having a frequency and provided between the first and the second inverter terminals;

a series-resonant circuit means having an instantaneous frequency dependent impedance and comprising a resonant capacitor and a resonant inductor connected in a series circuit across the first and the second inverter terminals and operative to draw an alternating resonant current from said inverter terminals:

a load-coupling means having a secondary winding connected to the lamp, g17 a primary winding coupled to the resonant capacitor and an intermediate node wherein the load coupling means connects said lamp in a parallel circuit with the resonant capacitor and to provide a predetermined magnitude of power to properly preheat and operate said lamp;

an artificial load means connected in parallel to the resonant capacitor via the intermediate node of the primary winding wherein the artificial load means has an instantaneous effective value and operative whenever said lamp is not connected to the secondary winding of the load coupling means; and a saturable feedback transformer means having a sensing winding and a pair of control windings wherein the saturable feedback transformer means couples itself to the series resonant circuit means and to the artificial load means via its sensing winding that senses an instantaneous amplitude of the alternating resonant current of the resonant circuit means and provides a control signal at the control terminals to determine and control said ON-time and frequency in proportion to an instantaneous resonant impedance developed in natural and resonant interaction between: (i) a load impedance of the lamp, and (ii) the instantaneous effective value of the artificial load means, and (iii) the frequency dependent impedance of the series-resonant circuit means wherein the saturable feedback transformer means is operable at a time when said lamp is effectively disconnected from the parallel connection with the resonant capacitor to increase the frequency up to a predetermined and adjustable magnitude wherein the increase is proportional to an increase of an effective value of a load applied in parallel with the resonant capacitor.

11. The device according to claim 10 wherein the load-coupling means comprises a load-coupling transformer which has a primary winding connected across the resonant capacitor, a lamp coupling winding to which the gas discharge lamp is connected, and a clamping winding equipped with a third intermediate terminal.

12. The device according to claim 11 wherein the artificial load means comprises diode means coupled between the third intermediate terminal and the DC terminals of the DC voltage supply means.

13. An energy conversion device comprising:

a series-resonant inverter circuit including a capacitor and an inductor connected in series wherein the circuit has an alternating resonant inductor current and delivers a high frequency signal to an effective load coupled effectively in parallel with the capacitor;

a DC voltage supply means providing a DC voltage between DC terminals;

an artificial load means connected to the DC terminals and operable to effectively couple itself in parallel with the capacitor; and a saturable feedback transformer means sensing the alternating resonant inductor current and controlling and adjusting the frequency of oscillation of the series-resonant inverter circuit in proportion to the effective load applied effectively in parallel with the capacitor wherein the saturable feedback transformer couples itself to the series-resonant inverter circuit and to the artificial load means.

* * * * *